United States Patent [19]
Leonard

[11] 3,884,111
[45] May 20, 1975

[54] INVERSION MAKER AND CHORD MATCHER

[76] Inventor: Verna M. Leonard, 8701 Highway 41, Fresno, Calif. 93710

[22] Filed: July 24, 1974

[21] Appl. No.: 491,253

[52] U.S. Cl. .............................. 84/471; 84/477 R
[51] Int. Cl. ........................................ G09b 15/02
[58] Field of Search ........................... 84/470–474, 84/477 R

[56] References Cited
UNITED STATES PATENTS

| | | | |
|---|---|---|---|
| 3,635,122 | 1/1972 | Perrault | 84/477 R |
| 3,691,895 | 9/1972 | Nessler | 84/471 |
| 3,700,785 | 10/1972 | Leonard | 84/470 |
| 3,733,956 | 5/1973 | Leonard | 84/471 |

Primary Examiner—Joseph W. Hartary
Assistant Examiner—John F. Gonzales
Attorney, Agent, or Firm—Ralph S. Branscomb

[57] ABSTRACT

A music arranging and improvising aid which enables the user to quickly determine the inversions of several related chords, generally chords in the same key signature, and select the inversions of the several chords which are most easily fingered in the sequence in which they are to be played. The names of the component scale tones of the chords spanning two or more octaves appear on individual panels which are slidable in channels on a backing, the backing being provided with indicia indicating the scale tones of the root chord and the inversions when the panel is in its base position. A dial may be provided above the panel structure which reiterates the scale tone information on the panels for quick reference.

2 Claims, 2 Drawing Figures

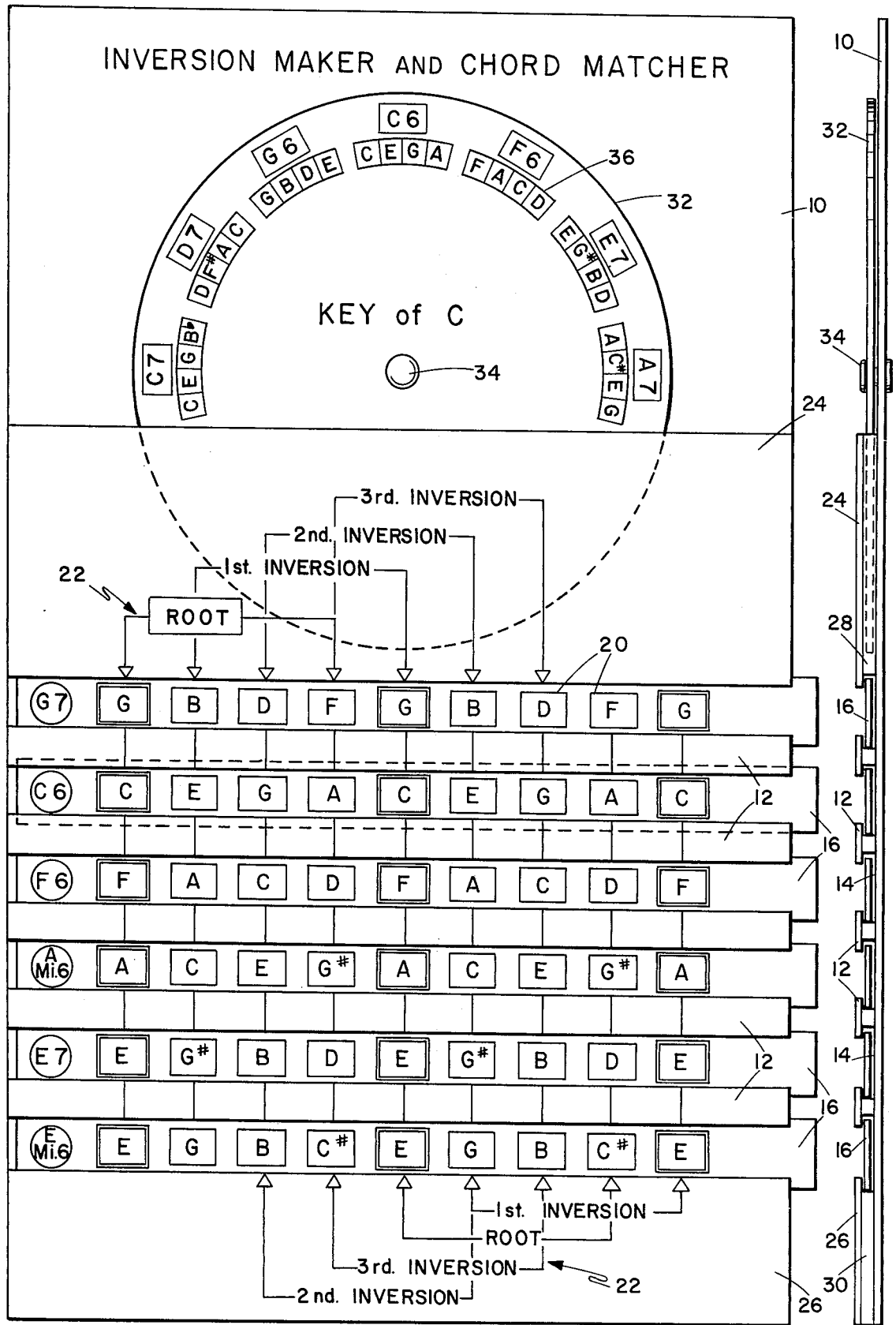

INVERSION MAKER AND CHORD MATCHER

BACKGROUND OF THE INVENTION

In each musical key signature there is a limited number of chords which, together with the inversions, are very commonly used. When arranging or improvising, some of the chords in a given chord sequence may be replaceable by an inversion with no loss of musical quality and simplification of the fingering of the sequence will be effected. However, the number of variations of a several chord sequence, considering the several possible inversions of each chord, is very large, and even experienced musicians have difficulty in mentally substituting various inversions to produce the most easily played arrangement.

SUMMARY OF THE INVENTION

The present invention comprises a series of panels, each identifying a particular chord and the names of the scale tones that constitute that chord in a linear spaced arrangement that spans at least two octaves. The panels slide independently in channels in a backing sheet such that the chord and scale tone names are always visible, and indicia on the backing sheet indicate the scale tones of the root chord and the first, second and third inversions when the panels are in the base position. The panels representing the chords in the desired chord sequence can be laterally adjusted by the user until one or more notes of consecutive chords are identical or very close, indicating that the fingering transition between the chords is very slight.

BRIEF DESCRIPTION OF THE DRAWINGS

FIG. 1 is a front elevation view of the invention; and
FIG. 2 is an elevation view of the right side of FIG. 1.

DETAILED DESCRIPTION OF THE PREFERRED EMBODIMENT

The invention comprises a generally planar backing member 10 made of stiff paper, plastic or any other material sufficiently rigid to be form-retaining. Lateral ribs 12 project from the backing and are preferably an integral part thereof, being no more than folds in a continuous sheet of paper if paper is used. The ribs define a plurality of shallow open-faced channels 14.

A plurality of elongated panels 16 are provided, each identify a separate chord as at 18 and having evenly-spaced indicia 20 naming the scale tones in the named chord in at least two octaves. In the illustrated embodiment, 4-tone chords are used and each panel identifies nine scale tones, or one more tone than two octaves.

The panels are dimensioned to slide in the channels and may be provided in any number. According to the overall scheme of the invention, one model would relate to a single key signature and with six of the channels 14 the three major chords and the three related minor chords can be displayed simultaneously.

Above the top channel and below the bottom channel are displays 22 identifying the first and last note of the root chord and three inversions on the panels when the panels are in the base position illustrated in FIG. 1. The upper display 22 appears on a planar member 24, and another planar member 26 at the lower edge bears the lower display. The members 24 and 26 are supported by intermediate layers 28 and 30.

When using the unit, the panels 16 representing the desired chords and adjusted in the slots to determine which of the root or inversions of one chord is most similar fingering-wise to the other chord or chords to be played in the same sequence. For example, if the F6 chord were to be followed by the A minor 6th chord, by sliding the A minor 6 panel (3rd from bottom) one place to the right, the root tone "A" of the A minor 6th chord and the "C" tone juxtapose with identical tones in the F6 chord, and the two remaining tones are only one note removed. The A minor 6 chord is thus most easily fingered after playing the first inversion of the F6 chord. Analogously, if the C6 chord were played first followed by F6 and C minor 6 it can be seen that a convenient sequence would be the root chord of C6 followed by the 2nd inversion of F6 and the third inversion of A minor 6.

It is clear that the unit could be designed for use with three-note chords or 5 note chords, as well as the four note chords shown, and units in key signatures other than C could be provided. Additionally, more than six of the chord panels could be used, since any panel is replaceable by another in its channel.

Above the channel structure there may be mounted a disc or dial 32, pivoted on a brad 34 or other structure. Around the disc are displayed in angular spaced relationships a number of chord symbols and the component scale tones 36 representing in one quick-reference array all of the chords in the relevant key signature for which there are panels. Inasmuch as there are 12 chords in each key signature which are common, 12 are represented on the illustrated dial, with the lower 5 being hidden by the planar element 24.

It will be clear from the above description that the chord inversion mixer is useful in arranging and improvising music for any chord instrument.

I claim:
1. A chord inversion mixer comprising:
   a. A generally planar backing member defining a plurality of parallel laterally extended forwardly open channels;
   b. a plurality of elongated panels dimensioned to be individually slideably received in any selected one of said channels;
   c. each of said panels being identified with a particular musical chord symbol and having thereon an array of spaced indicia naming the scale tones of the particular chord in more than one octave;
   d. indicia on said backing selectively registering with certain ones of the scale tone names and identifying same as components of the root chord and at least one inversion.

2. Structure according to claim 1 and including a disc rotatably mounted to an upper portion of said backing and including a planar member mounted on said backing and covering a lower portion of said disc;
   said disc having in angularly spaced peripheral array the names of a plurality of different chords and the associated scale tones corresponding to the chords identified on said panels.

* * * * *

Disclaimer 3,884,111.—*Verna M. Leonard*, Fresno, Calif. INVERSION MAKER AND CHORD MATCHER. Patent dated May 20, 1975. Disclaimer filed Oct. 13, 1977, by the inventor.

The term of this patent subsequent to May 20, 1992 has been disclaimed.

[*Official Gazette January 17, 1978.*]